US006832426B2

(12) United States Patent
Ojavuo

(10) Patent No.: US 6,832,426 B2
(45) Date of Patent: Dec. 21, 2004

(54) DEVICE FOR DECOUPLING THE INNER PART AND THE OUTER PART OF A CONSTANT VELOCITY JOINT FROM EACH OTHER AND THE METHOD

(75) Inventor: Asko Ojavuo, Kajaani (FI)

(73) Assignee: Tuomas-Trading Oy, Kajaani (FI)

( * ) Notice: Subject to any disclaimer, the term of this patent is extended or adjusted under 35 U.S.C. 154(b) by 170 days.

(21) Appl. No.: 10/148,353

(22) PCT Filed: Dec. 1, 2000

(86) PCT No.: PCT/FI00/01057

§ 371 (c)(1), (2), (4) Date: May 28, 2002

(87) PCT Pub. No.: WO01/39931

PCT Pub. Date: Jun. 7, 2001

(65) Prior Publication Data

US 2002/0178565 A1 Dec. 5, 2002

(30) Foreign Application Priority Data

Dec. 1, 1999 (FI) ........................................ 19992571
Apr. 7, 2000 (FI) ........................................ 20000156 U

(51) Int. Cl.[7] .......................... B23P 19/00; B23P 19/04

(52) U.S. Cl. ...................... 29/426.1; 29/426.5; 29/264; 29/261; 29/265

(58) Field of Search ............................ 29/426.1, 426.5, 29/261, 246, 240, 264, 266, 270, 283, 259, 265, 257, 251, 256, 263

(56) References Cited

U.S. PATENT DOCUMENTS 1,516,298 A * 11/1924 Iverson ........................ 29/261
1,601,752 A * 10/1926 Wortham ..................... 29/246
5,558,505 A * 9/1996 Mordue et al. ............. 417/360

* cited by examiner

*Primary Examiner*—John C. Hong
(74) *Attorney, Agent, or Firm*—Fildes & Outland, P.C.

(57) ABSTRACT

A device for decoupling an inner part and an outer part of a constant velocity joint from each other has a fastening element for gripping the inner part, an annular part placed in the end of the outer part of the joint and a nut that fits to the thread in the end of the outer part, which nut is wider than the hole in the annular part and the parts can be decoupled in a simple and safe way and without breaking the parts.

10 Claims, 8 Drawing Sheets

DEVICE FOR DECOUPLING THE INNER PART AND THE OUTER PART OF A CONSTANT VELOCITY JOINT FROM EACH OTHER AND THE METHOD

TECHNICAL FIELD

The invention relates to a device for decoupling a constant velocity joint from a drive shaft. The invention especially relates to a device, by which the constant velocity joints commonly used in power transmission of vehicles, can be decoupled from the drive shaft.

BACKGROUND OF THE INVENTION

The constant velocity joint is mainly composed of an outer part, inner part, balls and ball holder. The outer part is attached to the hub of the wheel of the vehicle and the inner part to the drive shaft, which functions as a transmission shaft between the gearing and the wheel. The balls have been placed in the ball holder, which on the other hand is inside the outer part. Spaces, in which the balls can move, have been arranged in the ball holder and in the outer part, which enables bending of the joint when the wheel turns. The end of the inner part is often a splined shaft, which has been arranged in a similarly splined hole in the ball holder. The shaft is secured in its place with a retaining ring, which can be opened for example by pliers or which opens by axial force directed towards it. In order to dissemble the joint, a relatively strong axial force is often needed even after releasing the retaining ring. The joint has been protected against dirt with a protective rubber.

Changing a broken protective rubber, cleaning and checking of balls and ball holder and sliding surfaces are often sufficient maintenance measures for joints. In connection with the work, the holders of the protective rubber of the joints are detached and the protective rubber is pushed aside. The joint is usually dissembled by striking the outer part with a hammer and drift, with sliding hammer or with air hammer, while the inner part must simultaneously be kept stationary. Often also a joint equipped with a safety ring that can be opened with needle-nose pliers must be dissembled by striking, because the grip of the pliers can be unstable due to damages in the secure ring or because the secure ring is slippery of lubricating grease. In order to cut down the costs it would be preferable to perform the maintenance work of the joint without detaching the drive shaft completely from the vehicle. In the commonly used striking method the drive shaft must be completely detached from the driving gear, because there is not enough room for striking when the shaft is in its position. It is difficult to arrange the outer part so that it stays in position, which makes it possible that the drive shaft is accidentally detached from the driving gear and the transmission oil leaks out. The force needed for striking can be excessive, because the retaining ring can be damaged as a result of stress during driving or because the groove of the hub and the shaft have been stuck. The industrial safety of the striking method is inadequate, and the working positions can be ergonomically unfavourable. The strikes can cause damage to the person performing the work, to the parts in the vicinity of the joint, or to the joint itself. When using striking tools, the chips coming loose due to the force of the strikes can cause eye injuries, in particular. For example damage in the ball holder of the joint can occur unnoticed and a latent defect compromising the traffic safety is developed in the joint. Due to deficiencies and laboriousness of the current methods the entire drive shaft is replaced for example in professional repair shops, although often only the outer drive joint is broken. This causes the owner of the vehicle substantial additional costs.

SUMMARY OF THE INVENTION

Some of the above-mentioned problems are solved and some deficiencies of the known technique are removed with the present invention, and a device for decoupling a constant velocity joint from the drive shaft is achieved, which device is simple and reliable and has low costs. Said advantages are achieved by a device according to the invention, which is characteristic by what is defined in the protective claims.

The device of the invention is mainly composed of a frame fitted into a fixing thread on the outer part of the constant velocity joint and of arms connected to it. The arms reach past the drive joint and mainly transversal fastening elements for gripping the inner part of the drive joint have been attached to them. There are preferably two transversal fastening elements, which have been placed opposite each other. The elements are clamped to the inner part preferably on a spot where the fixing groove of the protective rubber is, in which groove the projections on the corresponding surfaces of the fastenings elements have been fitted in. For example screws which have been fitted to run through the holes in the ends of the transversal fastening elements can function as clamping elements. Concurrently, the screws run through the holes in the arms. By turning the nut in the fixing thread of the constant velocity joint, reverse axial forces are effected in the inner and the outer part, and they are thus detached from each other.

The invention enables detaching of the constant velocity joint from the drive shaft without phases of work involving strikes. The device speeds up changing of the joint and the protective rubber. In addition, the work can be performed while the drive shaft is in its position in the vehicle, which saves costs considerably. The axial force is effected by the own mounting nut of the constant velocity joint. The attaching parts belonging to the device effectively grip the inner part so that the joint remains straight during the detachment. The device can easily be fitted for drive shafts of different thickness and lengths. The device according to the present invention is simple and reliable and has low costs, which makes it economically possible to acquire it both for professional use and for household use as well as for hobby use.

The invention is explained in detail in the following by help of some preferred examples of the embodiments and by referring to the attached drawings.

DETAILED DESCRIPTION OF THE INVENTION

FIGS. 1-5 illustrate a device for decoupling the outer part 1*a* and inner part 1*b* of a constant velocity joint 1 from each other. The device according to the invention has a frame 2 and transversal fastening elements 4 and fastening elements 4*e*, 4*f*.

The frame 2 in this embodiment is composed of an annular part 2*a* having a hole 2*e* which hole can be fitted to the fastening thread 1*e* of the outer part 1*a* of the drive joint. Angle arms 2*b*, which are in angle B in relation to the symmetry axis of the drive joint, have been attached to the annular part 2*a*. The size of the angle B is approximately 25–65 degrees, depending on the size of the constant velocity joint and on the work premises, in which the decoupling of the parts is performed. Straight parts 2*c*, which are practically parallel to the symmetry axis of the constant velocity joint and which extend sufficiently past the drive joint, have been joined to the arms 2*b*. Spaces 2*d* like holes or slots for the fastening elements 4 have been arranged in the straight parts 2*c*. The spaces 2*d* are situated at appropriate distances so that a nut 3 can be fitted in the fastening thread 1*e* behind the part 2*a* of the different constant velocity joints.

The transversal fastening elements 4 are composed of beams 4*b* on the opposite sides of the inner part 1*b*, which have slightly thinner ends 4*a*. Around the middle of the beams 4*b* there are longitudinal projections 4*c* of suitable length, which projections can be fitted into a groove 1*d* in the protective rubber of the inner part 1*b* if such groove has been made in the inner part. A space having the shape of the cross-sectional surface of the inner part 1*b* can, if necessary, be formed approximately to the middle of the beam, which can have the shape of a cylinder or a part of a cylinder, for example. In one preferred embodiment (FIG. 5) the projections 4*c* approximately at the middle of the beam have been placed in notches, whereupon for example the inner part with round cross-section rests against both sides of the notches enabling a firm grip. At the ends 4*a* there are holes 4*d* for fastening elements 4*e*. The beams 4*b* have been placed on the opposite sides of the inner part 1*b* by screws 4*e* fitted through the holes 4*d* and tightened into place with a nut 4*f*. The fastening element 4*e* also runs through the holes 2*d* in the arm 2*c* between the ends 4*a* of the beams 4*b*. The holes 4*d* of the fastening elements and the fastening elements 4*e*. 4*f* can also be arranged to the same side of the inner part 1*b*, which makes the arms 2*b*, 2*c* on the opposite side unnecessary. In this case a part, which functions as a second reaction point of the beams, must be fitted between the ends 4*a* of the beams 4*b*. The beams 4*b* can also be cut just behind the projections 4*c*. It is easier to work by this last-mentioned embodiment, not illustrated in the figures, in limited premises.

Figure 1:
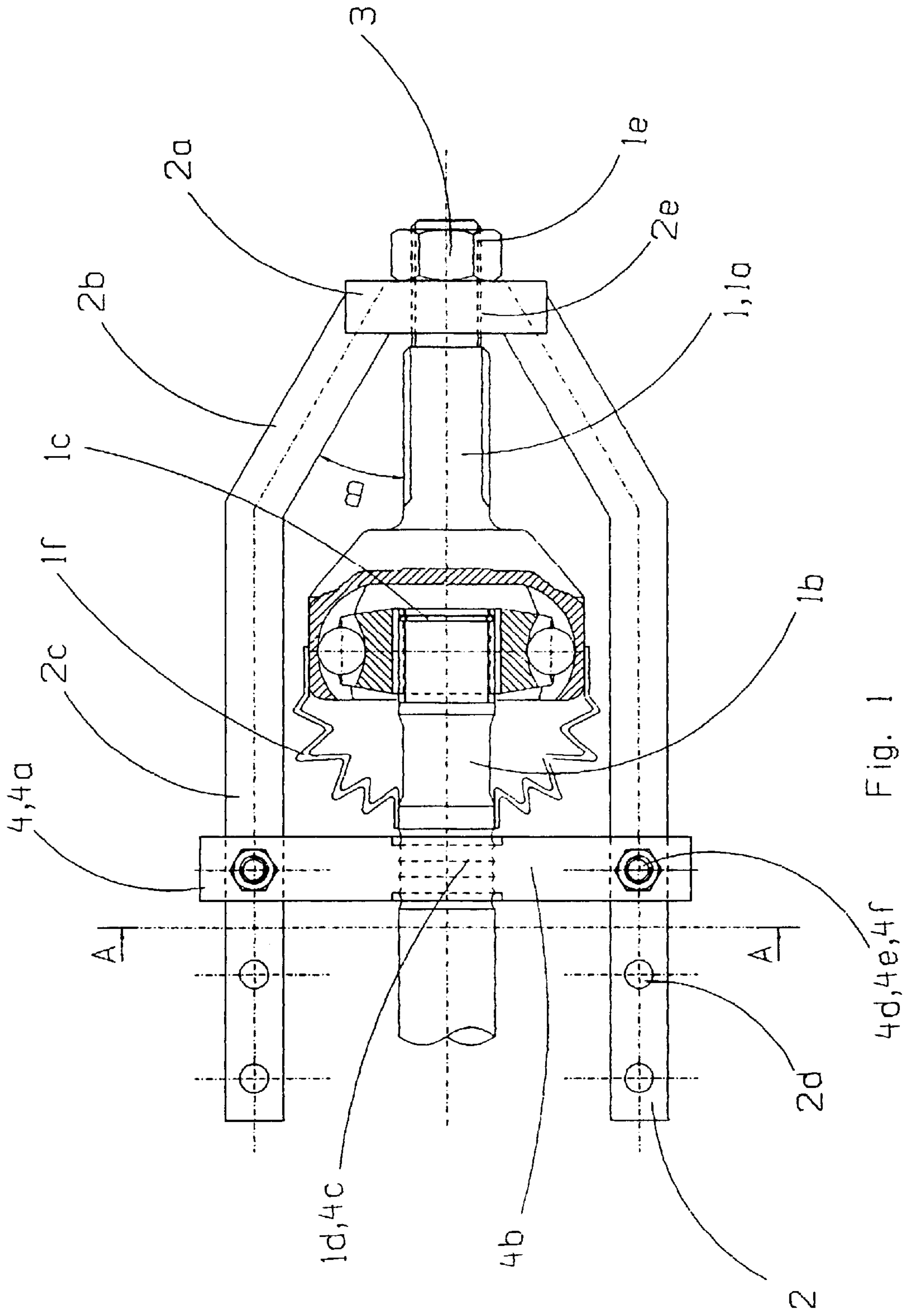
FIG. 1 illustrates a device according to the invention attached to a constant velocity joint seen from above and partly in cross-section.
Figure 2:
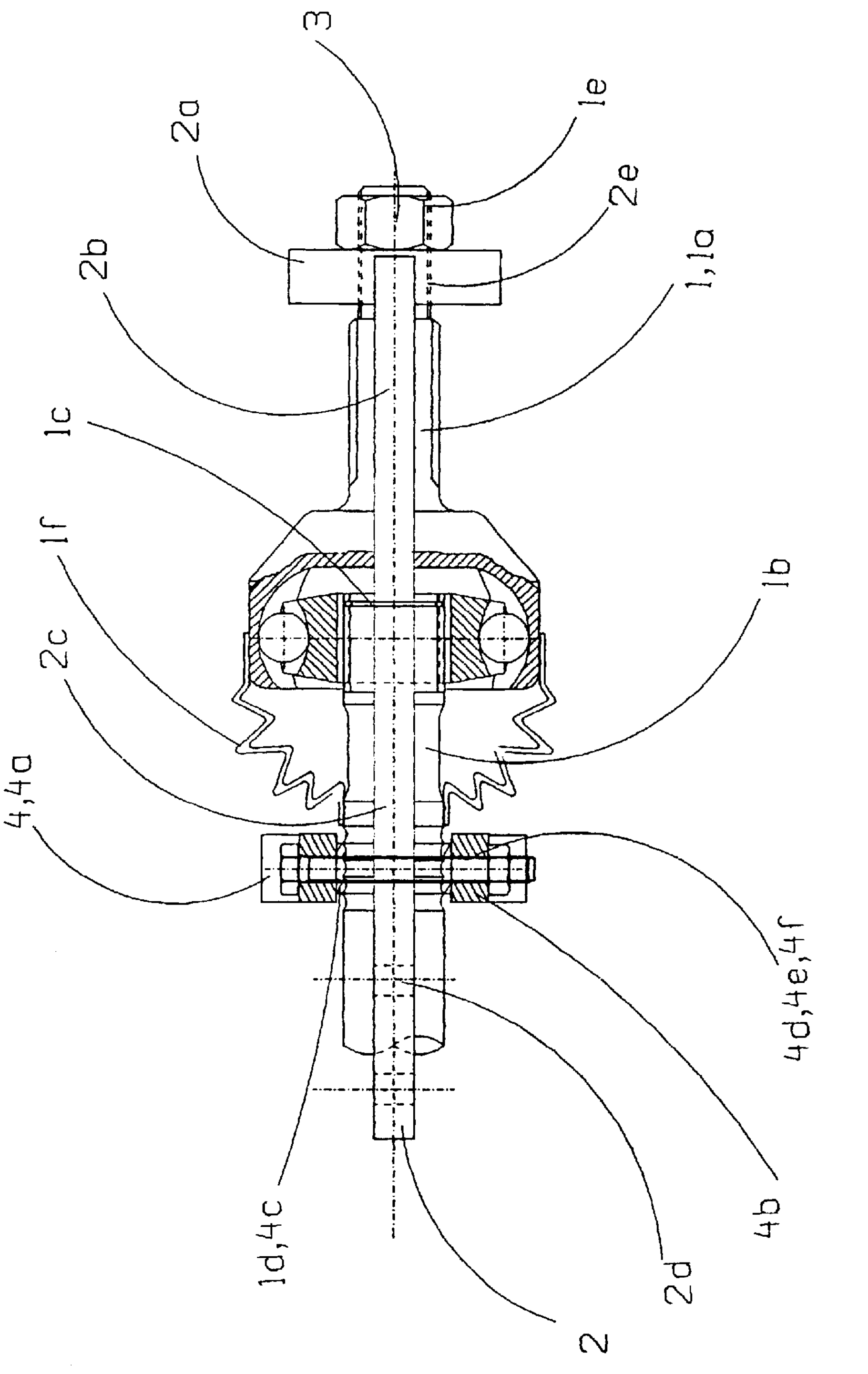
FIG. 2 illustrates a device according to FIG. 1 turned 90 degrees downwards and partly in cross-section.
Figure 4:
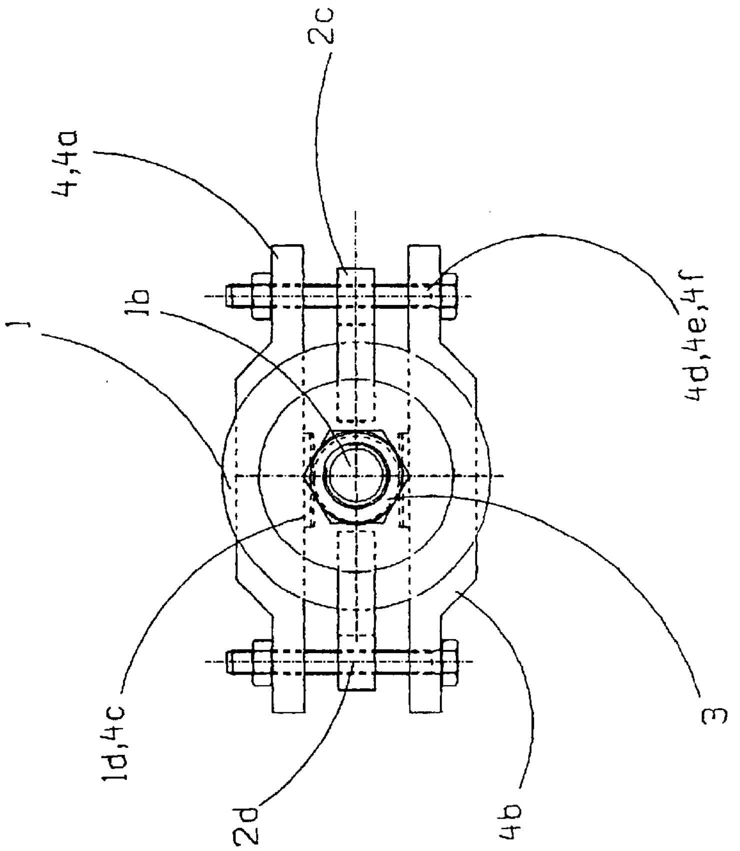
FIG. 4 illustrates a device according to the invention turned 90 degrees to the left from the position seen in FIG. 2.
Figure 3:
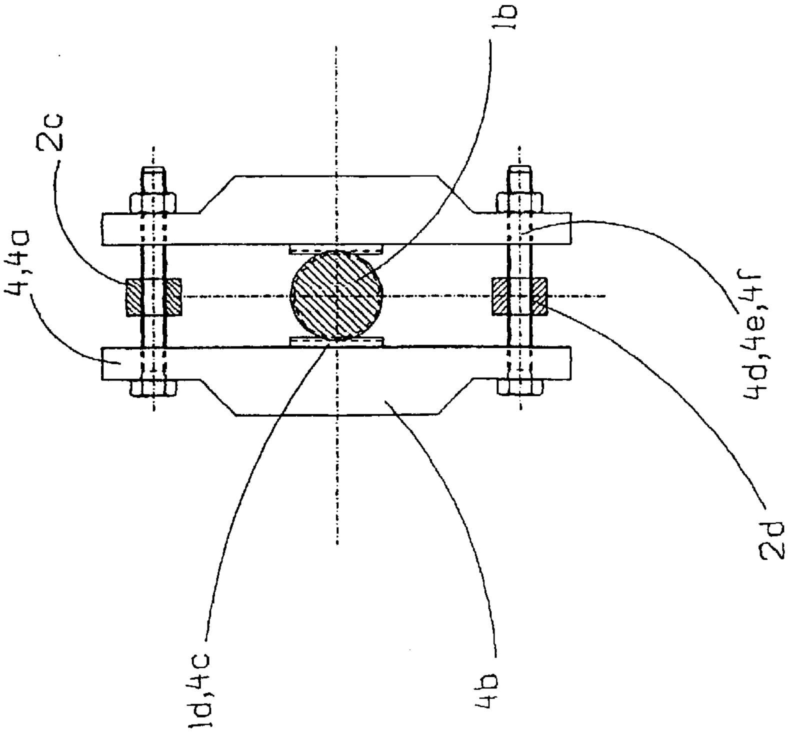
FIG. 3 presents a device of FIG. 1 in cross-section along the line A—A.
Figure 5:
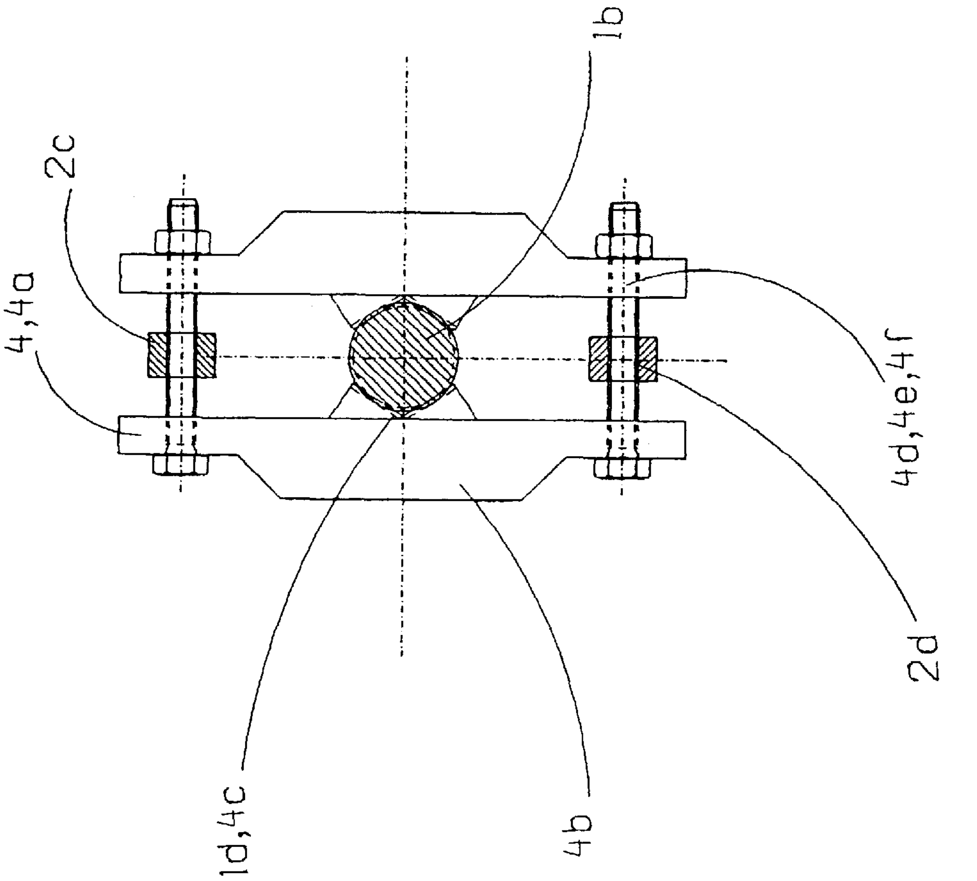
FIG. 5 illustrates an embodiment of the invention, in which the mounting faces of the inner part have the shape of a notch.
Figure 6:
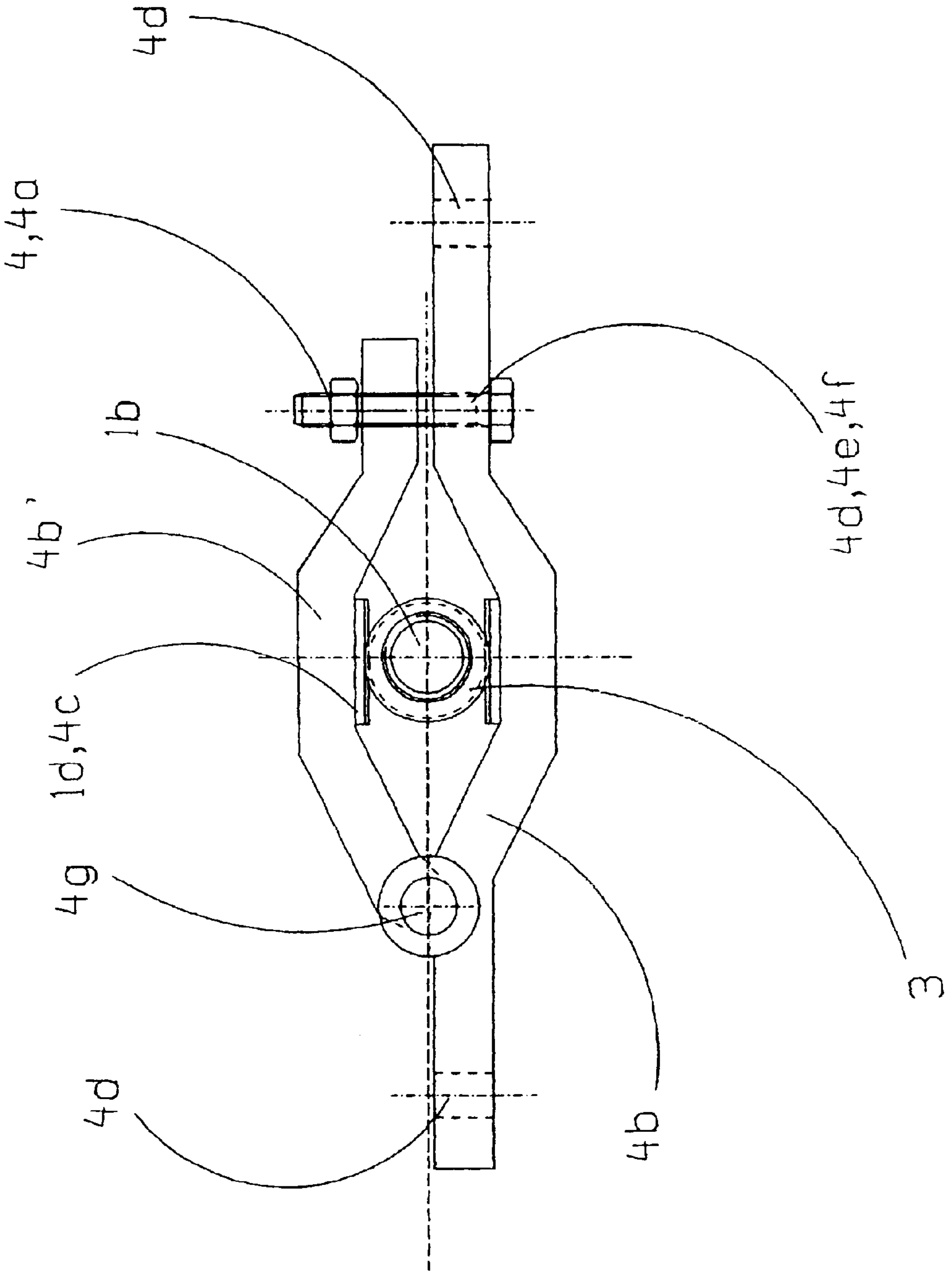
FIG. 6 illustrates an embodiment of the invention, in which the attachment to the drive shaft is effected by a fastener, which turns around the joint, and by one screw.

FIG. 6 illustrates an embodiment, in which the fastening element 4 is composed of a beam 4*b*, to which a second beam 4*b*' has been attached by a joint 4*g*. The beam 4*b*' is attached to the beam 4*b* from its one end with fastening elements 4, 4*a*. The beam 4*b* is attached to the frame 2 with fastening elements 4*d*, 4*e*, 4*f*.

Figure 7:
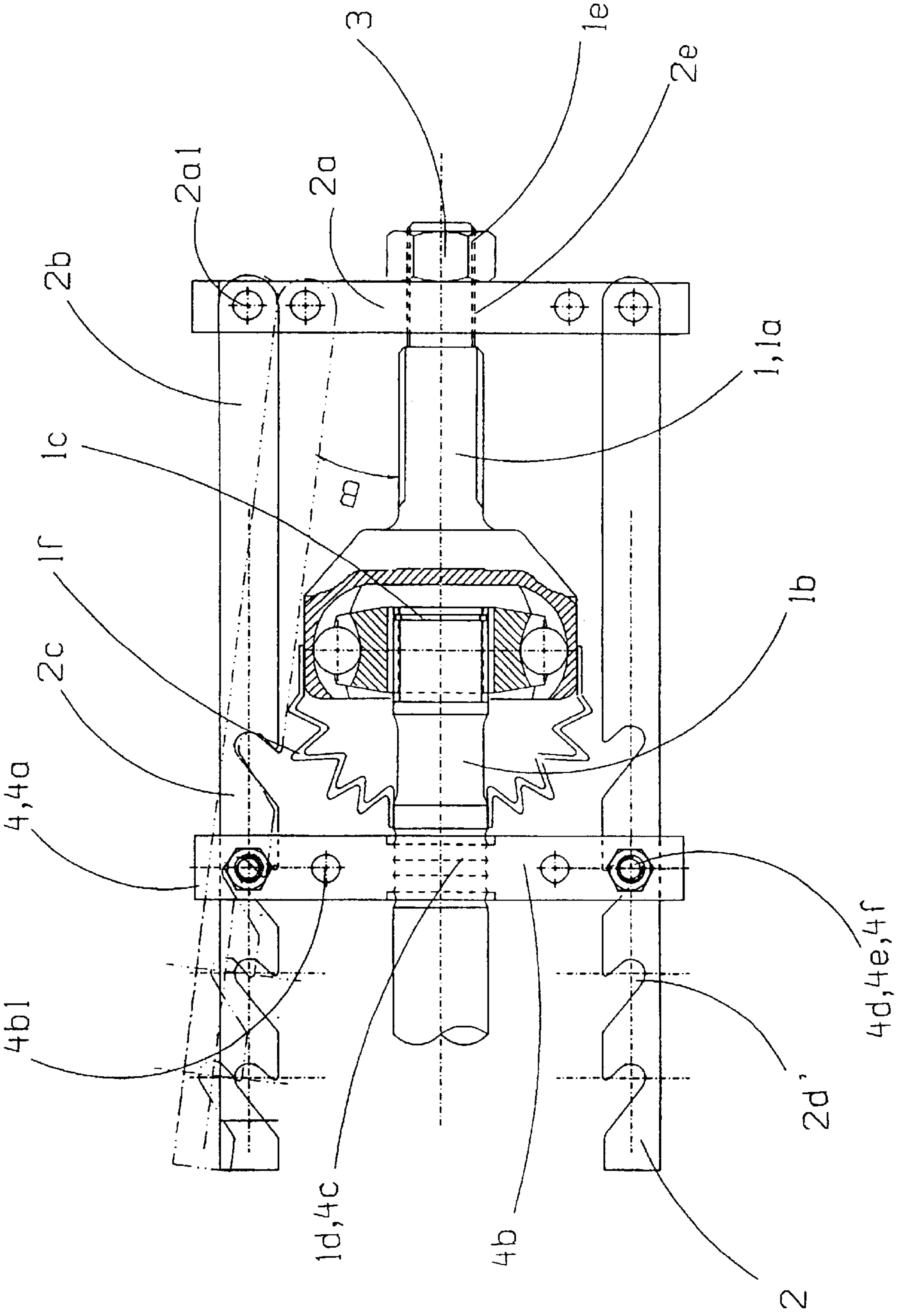
FIG. 7 illustrates an embodiment of the invention, in which the pulling force to the drive shaft is transmitted with parts equipped with slots.

In FIG. 7 there is an embodiment, in which the holes 2*d* of the straight parts 2*c* have been replaced by slots 2*d*'. The straight parts 2*c* have been attached to the annular part 2*a* with elements 2*a*1. Guide pins 4*b*1 have been added to the beams 4*b* of the transversal fastening elements 4, which pins have been fitted to one beam 4*b* with a crimp connection and to the other beam 4*b* with a sliding fit, for example. The pins 4*b*1 on their part take on the strains directed at the beams 4*b* and ensure the firm grip of the projections 4*c* to the drive shaft.

Figure 8:
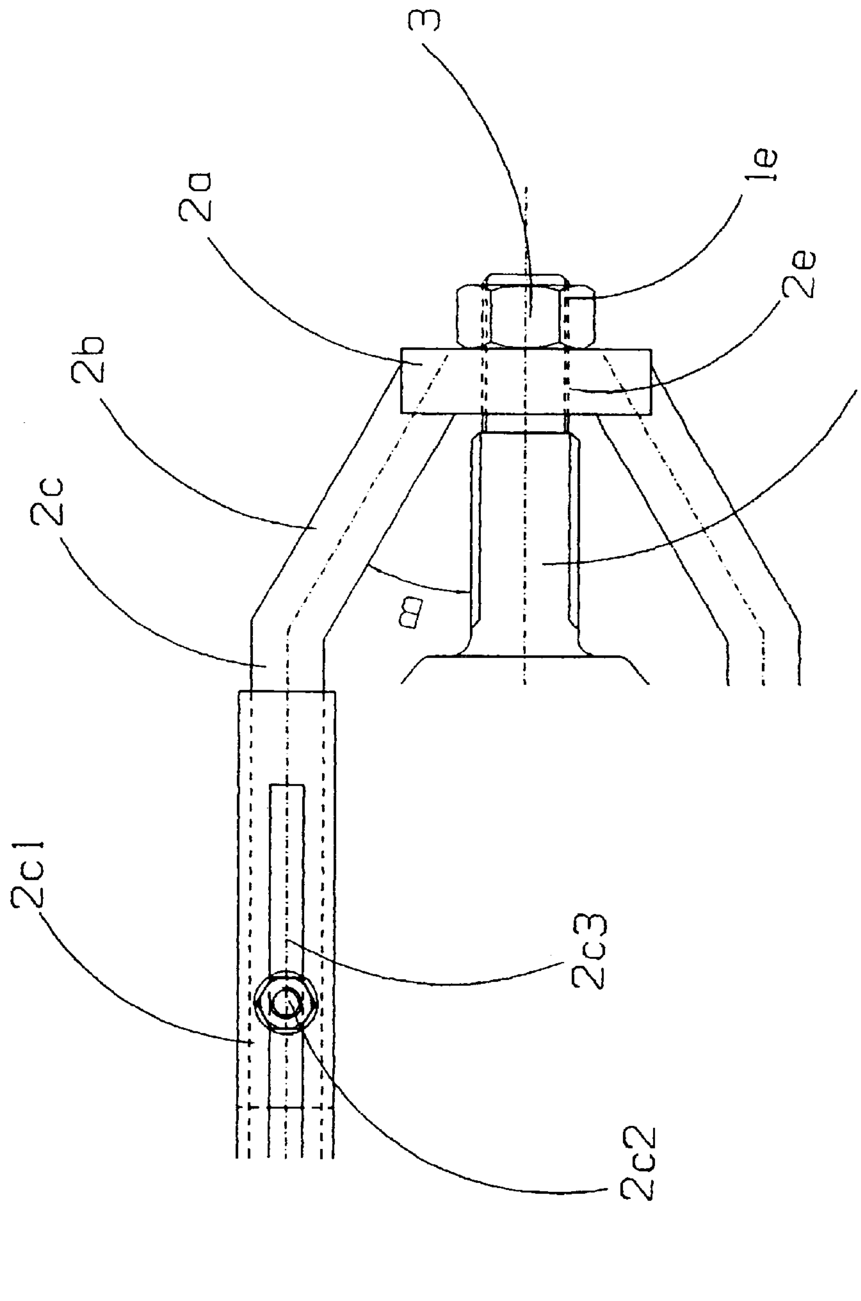
FIG. 8 illustrates an embodiment of the invention, in which the pulling force to the drive shaft is transmitted with parts, which are longitudinally adjustable.

FIG. 8 illustrates an embodiment of the invention, in which the pulling force to the drive shaft is transmitted by longitudinally adjustable lengthening parts 2*c*1. The lengthening parts 2*c*1 can slide along the straight part 2*c* guided by the guide slot 2*c*3 or similar. The parts 2*c*1 are attached to the desired spot with fastening elements 2*c*2.

Figure 9:
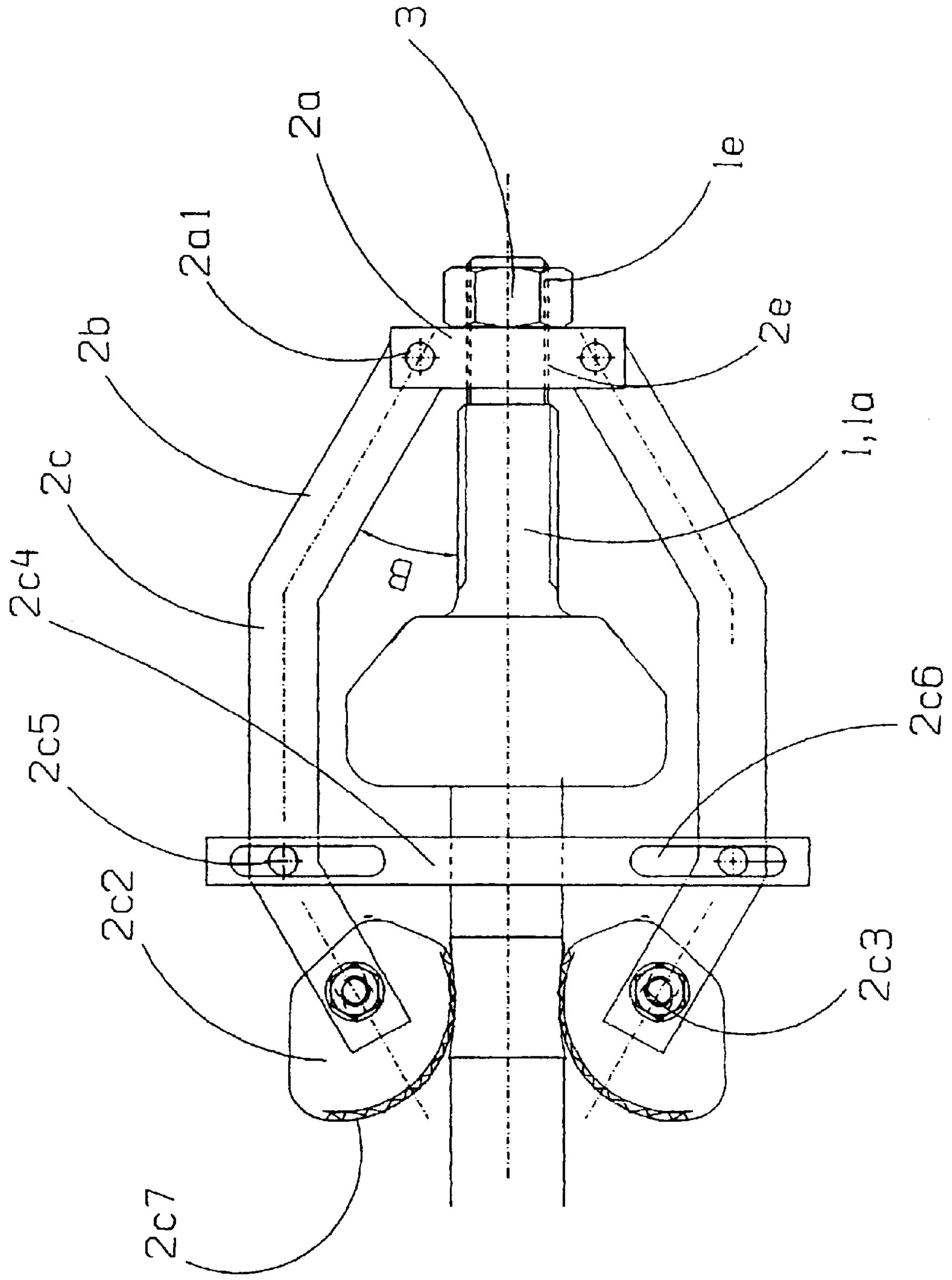
FIG. 9 illustrates an embodiment of the invention, in which the pulling force to the drive shaft is transmitted with self-tightening parts.

FIG. 9 illustrates an embodiment of the invention, in which the pulling force to the drive shaft is transmitted with self-tightening eccentric tightening parts 2*c*2. The parts 2*c*2 have been attached to the straight part 2*c* with elements 2*c*3, which enable twisting of the parts 2*c*2 around them. When twisting the nut 3, the friction surfaces 2*c*7 of the tightening parts 2*c*2 are tightened to the drive shaft and the pulling force needed gets transmitted. Due to a reaction force, the straight parts 2*c* tend to get away from the drive shaft, which reaction force is taken on with a transversal beam 2*c*4. The beam 2*c*4 has been attached from its ends to the straight parts 2*c* with fastening elements 2*c*5. The beam 2*c*4 has slot-formed spaces 2*c*6, in which the elements 2*c*5 can move in order to adjust the gap 2*c* between the parts. The straight parts 2*c* have been attached to the annular part 2*a* with joints 2*a*1.

The device according to the invention functions in the following way. The annular part 2*a* of the frame 2 is placed in the thread 1*e* of the drive joint, whereupon the arms 2 reach past the groove 1*d* in the inner part 1*b* of the protection rubber. The beams 4*b* are attached to a space, hole 2*d* or slot 2*d*' in the straight part 2*c* of the arm 2 by help of attachment parts 4*e*, 4*f* and which beams are tightened into place. Thus the projections 4*c* in the beams 4*b* fit into the grooves Id in the protective rubber, and the part 4 is thus firmly attached to the inner part 1*b*. By choosing appropriately elements 4*e*, 4*f*, the fastening element 4 can be attached to parts 1*b* of different sizes 1*b*. Instead of beams 4*b*, the attaching to the drive shaft can also be effected by help of the self-tightening parts 2*c*2. In order to decouple the parts 1*a*, 1*b* of the constant velocity joint from each other, the own nut 3 of the joint is screwed to the fastening thread 1*e*. By tightening the nut 3 adequately, an axial force is directed to said parts, which force forces the retaining ring 1*c* into its groove, making the joint to loosen. The tightening of the nut can be continued, if the joint between the grooves of parts 1*a*, 1*b* is tight. The device also makes it easier to release the retaining ring opened by pliers. The axial force generated with the device is practically directed in the direction of the longitudinal axis of the parts 1*a*, 1*b* of the drive joint and thus the parts remain straight and the loosening work takes place efficiently.

The sole purpose of the figures and the description connected to them is to clarify the present invention The details of the device can differ within the scope of the accompanying protective claims and the inventive idea presented in the description of the invention. For example the annular part 2*a* and the fastening element 4 can be formed according to different constant velocity joints. It is obvious to the person skilled in the art that the dimensions and the technical solutions of the device can vary depending on the purpose of use. Further, it is obvious to the person skilled in the art that an embodiment of the invention can vary depending on the conditions of use, customers needs, serial work methods and within the scope of productional solution is implemented in connection with mass production.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A device for decoupling an inner part and an outer part of a constant velocity joint, which has an inner part attached to a drive shaft and an outer part which has a thread at its end, which outer part is axially attached to a hub of a wheel of a vehicle, from each other, which device has a fastening element for gripping the inner part, characterized in that the device comprises an annular part fitted to the end of the outer part of the joint, which annular part has an axial hole and a nut fitting to the thread of the end of the outer part, which nut has an outer diameter larger than the diameter of the hole of the annular part the annular part fitted to cooperate with the nut for pulling the thread of the outer part of the constant velocity joint by rotating the nut.

2. A device according to claim 1, having at least two arms, which join the fastening element and the annular part.

3. A device according to claim 2, where the arms are angular arms, which have straight parts in the inner part side.

4. A device according to claim 2, in which the fastening element has at least one beam, which is attached from its ends to the arms on the opposite sides.

5. A device according to claim 4, which has several axially placed fastening points in the arms, which fastening points the beam can be attached to.

6. A device according to claim 1, for decoupling parts of such a constant velocity joint, in which the inner part has at least one transversal groove, which device has in the fastening element at least one projection that is placed in the groove.

7. A device according to claims 1, having a straight part in the inner end of the arm and a lengthening part, which is attached to it.

8. A device according to claim 1, in which fastening element there is at least one eccentric tightening part, by which the fastening element is attached to the inner part, when the device if pushed inwards from the annular part.

9. A device according to claim 1, in which the outer end of the arm forms an angle of 25–65 degrees in relation to the outer part.

10. A method for decoupling an inner part and an outer part of a constant velocity joint from each other, whereby the joint has the inner part which is attached to a drive shaft of a vehicle and the outer part axially attached to a hub of a wheel of the vehicle and which has a thread at the end, which device has a fastening element for gripping the inner part, characterized in that a device is used, which has an annular part placed in the end of the outer part of the joint, which annular part has an axial hole so that the annular part is fitted to the end of the outer part of the joint so that a part of the thread of the end of the outer part is left outside the annular part, and the inner part is gripped by the fastening element, after which a nut is fitted to the thread of the end of the outer part, which nut has an outer diameter larger than the diameter of the hole of the annular part and the nut is tightened.

* * * * *